United States Patent
Ong

(10) Patent No.: US 8,630,056 B1
(45) Date of Patent: Jan. 14, 2014

(54) HYBRID DRIVE ADJUSTING SPIN-UP PROFILE BASED ON CACHE STATUS OF NON-VOLATILE SEMICONDUCTOR MEMORY

(75) Inventor: Choo-Bhin Ong, Foothill Ranch, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 206 days.

(21) Appl. No.: 13/230,638

(22) Filed: Sep. 12, 2011

(51) Int. Cl.
*G11B 21/02* (2006.01)

(52) U.S. Cl.
USPC ............ 360/75; 360/55; 360/78.08; 711/112; 711/100

(58) Field of Classification Search
USPC ........... 360/69, 78.08, 73.03, 55, 75; 714/5.1, 714/5.11; 711/113, 203, 103, 112, 100; 713/320; 369/95
See application file for complete search history.

(56) References Cited

U.S. PATENT DOCUMENTS

| | | | |
|---|---|---|---|
| 5,333,138 A | 7/1994 | Richards et al. | |
| 5,581,785 A | 12/1996 | Nakamura et al. | |
| 5,586,291 A | 12/1996 | Lasker et al. | |
| 6,044,439 A | 3/2000 | Ballard et al. | |
| 6,115,200 A | 9/2000 | Allen et al. | |
| 6,275,949 B1 | 8/2001 | Watanabe | |
| 6,429,990 B2 | 8/2002 | Serrano et al. | |
| 6,661,591 B1 | 12/2003 | Rothberg | |
| 6,662,267 B2 | 12/2003 | Stewart | |
| 6,687,850 B1 | 2/2004 | Rothberg | |
| 6,754,021 B2 | 6/2004 | Kisaka et al. | |
| 6,785,767 B2 | 8/2004 | Coulson | |
| 6,807,630 B2 | 10/2004 | Lay et al. | |
| 6,909,574 B2 | 6/2005 | Aikawa et al. | |
| 6,920,533 B2 | 7/2005 | Coulson et al. | |
| 6,966,006 B2 | 11/2005 | Pacheco et al. | |
| 6,968,450 B1 | 11/2005 | Rothberg et al. | |
| 6,989,953 B1 | 1/2006 | Codilian | |
| 7,017,037 B2 | 3/2006 | Fortin et al. | |
| 7,028,174 B1 | 4/2006 | Atai-Azimi et al. | |
| 7,082,494 B1 | 7/2006 | Thelin et al. | |
| 7,107,444 B2 | 9/2006 | Fortin et al. | |
| 7,120,806 B1 | 10/2006 | Codilian et al. | |
| 7,142,385 B2 | 11/2006 | Shimotono et al. | |
| 7,334,082 B2 | 2/2008 | Grover et al. | |
| 7,395,452 B2 | 7/2008 | Nicholson et al. | |
| 7,411,757 B2 | 8/2008 | Chu et al. | |
| 7,454,653 B2 | 11/2008 | Nicholson et al. | |
| 7,461,202 B2 | 12/2008 | Forrer, Jr. et al. | |
| 7,469,336 B2 | 12/2008 | Choo | |

(Continued)

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf.

(Continued)

*Primary Examiner* — Ali Neyzari

(57) ABSTRACT

A hybrid drive is disclosed comprising a head actuated over a disk, and a non-volatile semiconductor memory (NVSM) operable to cache data. When beginning to spin up the hybrid drive, a first spin-up profile is used while servicing access commands using the NVSM, including write commands and read commands. When a cache event occurs, spinning up the disk is finished using a second spin-up profile in order to spin-up the disk faster.

18 Claims, 4 Drawing Sheets

(56) References Cited

U.S. PATENT DOCUMENTS

| | | | |
|---|---|---|---|
| 7,472,222 B2 | 12/2008 | Auerbach et al. | |
| 7,477,477 B2 | 1/2009 | Maruchi et al. | |
| 7,509,471 B2 | 3/2009 | Gorobets | |
| 7,516,346 B2 | 4/2009 | Pinheiro et al. | |
| 7,610,438 B2 | 10/2009 | Lee et al. | |
| 7,613,876 B2 | 11/2009 | Bruce et al. | |
| 7,620,784 B2 | 11/2009 | Panabaker | |
| 7,644,231 B2 | 1/2010 | Recio et al. | |
| 7,685,360 B1 | 3/2010 | Brunnett et al. | |
| 7,752,491 B1 | 7/2010 | Liikanen et al. | |
| 8,015,433 B2 * | 9/2011 | Chu et al. | 714/5.1 |
| 8,111,476 B2 * | 2/2012 | Arizono et al. | 360/73.03 |
| 8,341,339 B1 * | 12/2012 | Boyle et al. | 711/103 |
| 8,375,190 B2 * | 2/2013 | Hamilton et al. | 711/170 |
| 2002/0156970 A1 | 10/2002 | Stewart | |
| 2005/0251617 A1 | 11/2005 | Sinclair et al. | |
| 2006/0195657 A1 | 8/2006 | Tien et al. | |
| 2007/0186039 A1 | 8/2007 | Nam | |
| 2008/0040537 A1 | 2/2008 | Kim | |
| 2008/0059694 A1 | 3/2008 | Lee | |
| 2008/0130156 A1 | 6/2008 | Chu et al. | |
| 2008/0177938 A1 | 7/2008 | Yu | |
| 2008/0222353 A1 | 9/2008 | Nam et al. | |
| 2008/0256287 A1 | 10/2008 | Lee et al. | |
| 2008/0307270 A1 | 12/2008 | Li | |
| 2009/0019218 A1 | 1/2009 | Sinclair et al. | |
| 2009/0031072 A1 | 1/2009 | Sartore | |
| 2009/0103203 A1 | 4/2009 | Yoshida | |
| 2009/0106518 A1 | 4/2009 | Dow | |
| 2009/0144501 A2 | 6/2009 | Yim et al. | |
| 2009/0150599 A1 | 6/2009 | Bennett | |
| 2009/0172324 A1 | 7/2009 | Han et al. | |
| 2009/0249168 A1 | 10/2009 | Inoue | |
| 2009/0271562 A1 | 10/2009 | Sinclair | |
| 2009/0327603 A1 | 12/2009 | McKean et al. | |
| 2010/0088459 A1 | 4/2010 | Arya et al. | |
| 2010/0157463 A1 | 6/2010 | Arizono et al. | |

OTHER PUBLICATIONS

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010.

Xiaojian Wu, A. L. Narasimha Reddy, "Managing Storage Space in a Flash and Disk Hybrid Storage System", http://www.ee.tamu.edu/~reddy/papers/mascots09.pdf.

Tao Xie, Deepthi Madathil, "SAIL: Self-Adaptive File Reallocation on Hybrid Disk Arrays", The 15th Annual IEEE International Conference on High Performance Computing (HIPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

U.S. Appl. No. 12/720,568, filed Mar. 9, 2010, 22 pages.

* cited by examiner

HYBRID DRIVE ADJUSTING SPIN-UP PROFILE BASED ON CACHE STATUS OF NON-VOLATILE SEMICONDUCTOR MEMORY

BACKGROUND

Hybrid drives are conventional disk drives augmented with a non-volatile semiconductor memory (NVSM) such as a flash which helps improve certain aspects of the disk drive. For example, the non-volatile semiconductor memory may store boot data in order to expedite the boot operation of a host computer. Another use of a NVSM may be to store frequently accessed data and/or non-sequential data for which the access time is typically much shorter than the disk (which suffers from mechanical latency including seek and rotational latency). Other policies may reduce write amplification of the NVSM in order to maximize its longevity, such as storing frequently written data to the disk (or data having a write/read ratio that exceeds a predetermined threshold).

DETAILED DESCRIPTION OF EMBODIMENTS OF THE INVENTION

Figure 1:
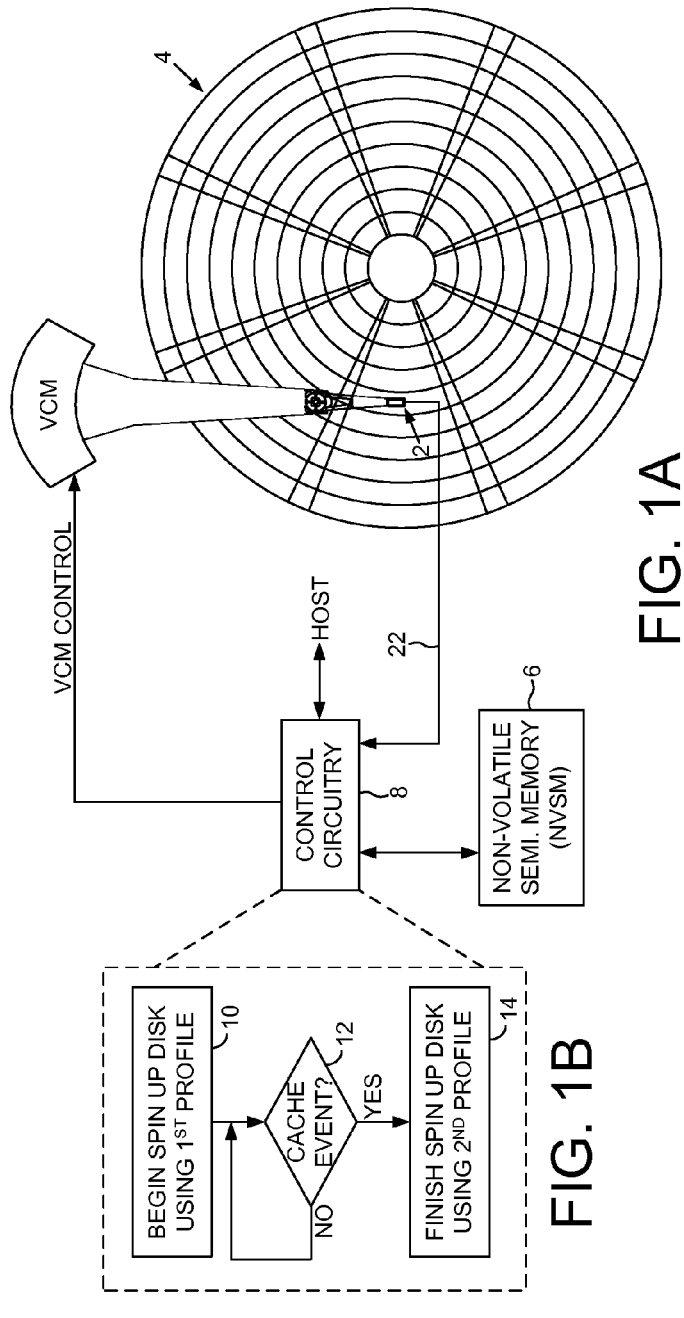
FIG. 1A shows a hybrid drive according to an embodiment of the present invention comprising a head actuated over a disk and a non-volatile semiconductor memory (NVSM) operable to cache data.
FIG. 1B is a flow diagram according to an embodiment of the present invention wherein the hybrid drive begins spinning up the disk using a first spin-up profile, and when a cache event occurs, the hybrid drive finishes spinning up the disk using a second spin-up profile in order to spin-up the disk faster.
FIG. 1C shows a first (high power) spin-up profile and a second (low power) spin-up profile according to an embodiment of the present invention.

FIG. 1A shows a hybrid drive according to an embodiment of the present invention comprising a head 2 actuated over a disk 4, and a non-volatile semiconductor memory (NVSM) 6 operable to cache data. The hybrid drive further comprises control circuitry 8 operable to execute the flow diagram of FIG. 1B in order to spin-up the hybrid drive beginning with a first spin-up profile while servicing access commands using the NVSM (step 10), including write commands and read commands. When a cache event occurs (step 12), the control circuitry finishes spinning up the disk using a second spin-up profile in order to spin-up the disk faster (step 14).

FIG. 1C illustrates an embodiment of the present invention wherein the first spin-up profile corresponds to a low power mode (reduced power consumption) by spinning up the disk toward an operating speed using a less aggressive acceleration. If a cache event occurs while spinning up the disk using the first spin-up profile, the control circuitry switches to a second, higher power spin-up profile (increased acceleration) in order to finish spinning up the disk faster. If a cache event does not occur during the spin-up operation, the control circuitry finishes spinning up the disk using the first, low power spin-up profile.

The hybrid drive may spin-up the disk for any suitable reason, such as when the hybrid drive is powered on or reset wherein the control circuitry executes a boot operation. In another embodiment, the hybrid drive may spin-up the disk when exiting a low power mode. In one embodiment, the control circuitry may begin the spin-up operation immediately as part of a boot operation or when exiting a low power mode, and in another embodiment, the control circuitry may delay spinning up the disk. For example, in one embodiment the control circuitry may delay spinning up the disk until it predicts that the disk will be needed based on the space available in the NVSM write cache or the pattern of access commands that indicates a cache miss is imminent. The control circuitry may begin spinning up the disk using the first spin-up profile, but if the NVSM write cache fills up too fast or the cache miss prediction is too late and access to the disk is needed sooner, the control circuitry may finish spinning up the disk using the second spin-up profile.

The control circuitry may switch to the second spin-up profile based on any suitable cache event. In an embodiment shown in the flow diagram of FIG. 2, the control circuitry begins spinning up the disk using the first spin-up profile (step 16) and receives access commands (write/read) from the host (step 18). If the access command is a write command (and there is space available in the NVSM write cache), or a read command with a cache hit (step 20), then the access command is serviced using the NVSM (step 22). If the access command is a read command with a cache miss (step 20), the control circuitry finishes spinning up the disk using the second spin-up profile (step 24) so that the read command can be serviced using the disk (step 26).

Figure 2:
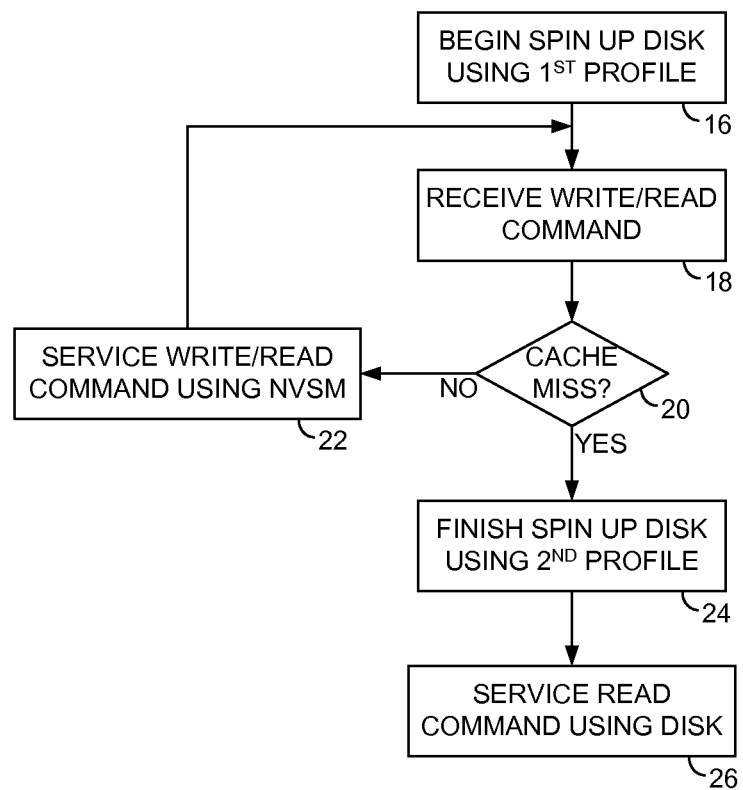
FIG. 2 is a flow diagram according to an embodiment of the present invention wherein the cache event that changes the spin-up profile occurs when a read command cannot be serviced by the NVSM (cache miss).
Figure 3:
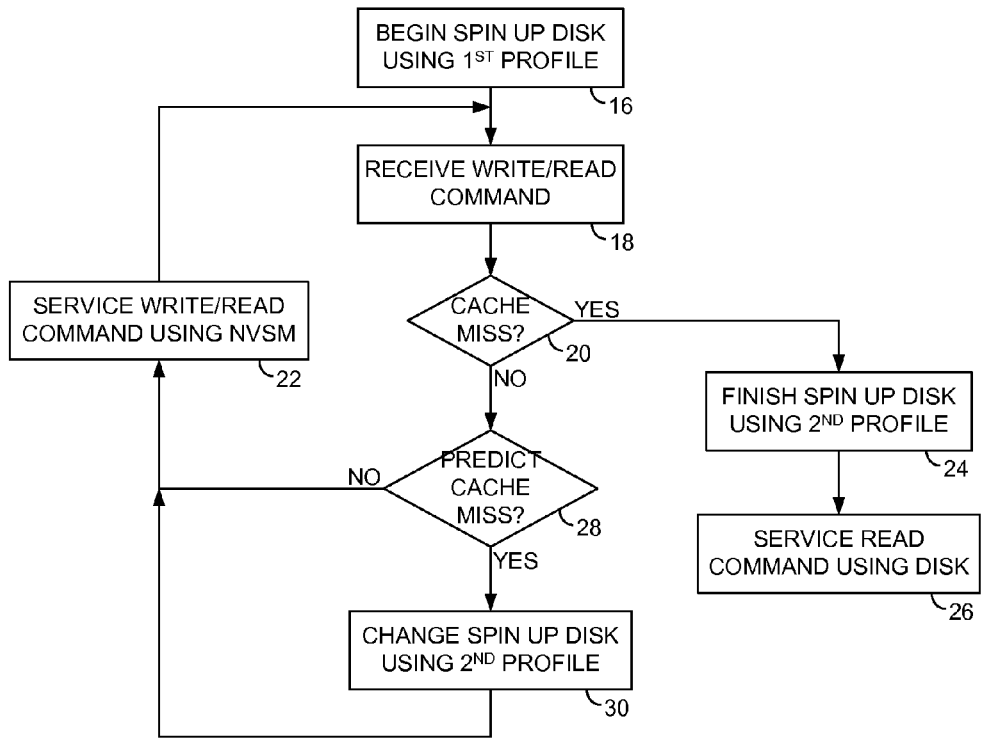
FIG. 3 is a flow diagram according to an embodiment of the present invention wherein the cache event that changes the spin-up profile occurs when the control circuitry predicts an imminent read command will be received that cannot be serviced by the NVSM (predicted cache miss).

FIG. 3 is a flow diagram according to an embodiment of the present invention that extends on the flow diagram of FIG. 2, wherein if the access command is a write command or a read command with a cache hit (step 20), the control circuitry evaluates the pattern of access commands in order to predict that a read command with a cache miss is about to be received (step 28). For example, in one embodiment the control circuitry may maintain a history of access commands received as part of booting the host, and optionally the user's access pattern after the host has booted. The control circuitry may then compare the pattern of access commands to the saved history to predict that the end of a cached boot sequence is approaching and therefore a cache miss is likely imminent. Accordingly, prior to reaching the end of the boot sequence cached in the NVSM, the control circuitry may switch to the second spin-up profile in order to spin-up the disk faster (step 30) in anticipation of a cache miss.

Figure 4:
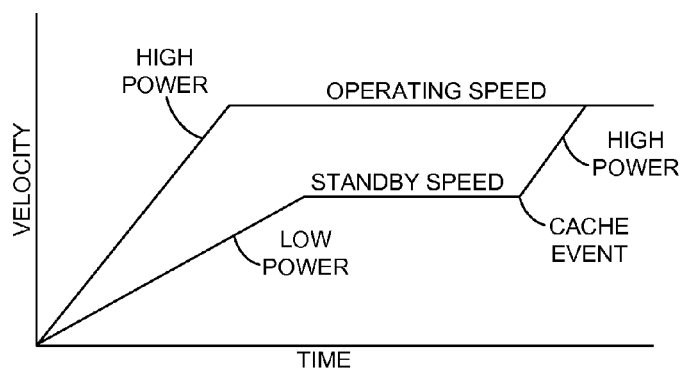
FIG. 4 shows an embodiment of the present invention wherein the disk is spun-up using the low power spin-up profile to a standby operating speed, and then spun-up to a normal operating speed when a cache event occurs.

FIG. 4 shows an embodiment of the present invention wherein the control circuitry may spin-up the disk using the first (low power) spin-up profile to a standby speed less than the normal operating speed while servicing access commands using the NVSM. When a cache event occurs, such as a cache miss or a predicted cache miss, the control circuitry finishes spinning up the disk to the normal operating speed using the second (high power) spin-up profile.

Figure 5:
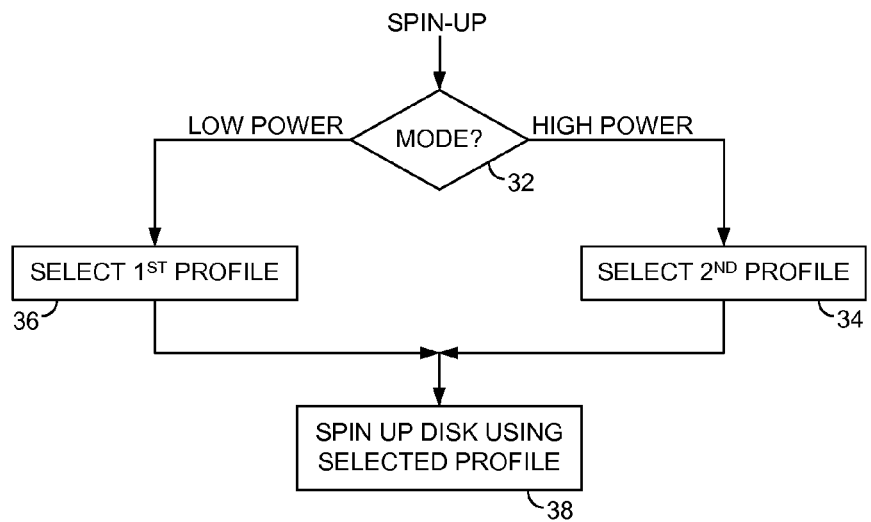
FIG. 5 is a flow diagram according to an embodiment of the present invention wherein an operating mode of the hybrid drive is determined and then the disk is spun-up based on the operating mode.

FIG. 5 is a flow diagram according to an embodiment of the present invention wherein when the control circuitry is ready to spin-up the disk (e.g., during a boot operation or exiting a low power mode), the control circuitry determines an operating mode of the hybrid drive based on a cache status of the NVSM (step 32). For example, in one embodiment the cache status of the NVSM may indicate an amount of data cached in the NVSM. If little or no data is cached in the NVSM, the control circuitry may select the second (high power) spin-up profile (step 34), whereas if sufficient data is cached in the NVSM the control circuitry may select the first (low power) spin-up profile (step 36) and then spin-up the disk using the selected profile (step 38).

Figure 6:
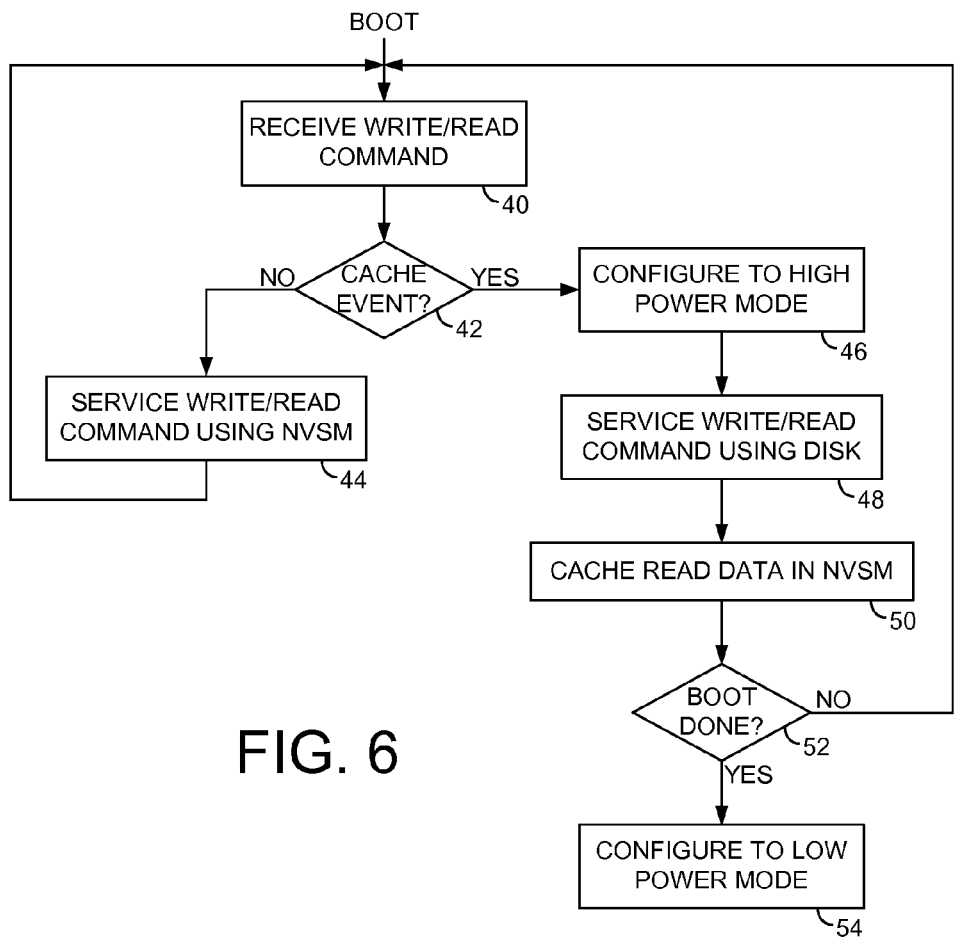
FIG. 6 is a flow diagram according to an embodiment of the present invention wherein the operating mode of the hybrid drive is configured to select the first spin-up profile after caching data for a number of read commands in the NVSM during a boot operation.

FIG. 6 is a flow diagram according to an embodiment of the present invention wherein the control circuitry may receive access commands (step 40) while spinning up the disk using the first (low power) spin-up profile during a boot operation. If the access command is a write command and there is space remaining in the NVSM write cache, or the access command is a read command with a cache hit (step 42), the access command is serviced using the NVSM while continuing to spin-up the disk using the first spin-up profile (step 44). If the NVSM write cache is full (or near full) or the access command is a read command with a cache miss (step 42), then the control circuitry switches to the second (high power) spin-up profile and finishes spinning up the disk (step 46). The control circuitry then services the access command using the disk (step 48). If the access command is a read command, the data read from the disk is cached in the NVSM read cache (step 50). The flow diagram is then repeated starting at step 40 until the boot sequence is finished (step 52), wherein the control circuitry configures the operating mode into a low power mode (step 54) so that the control circuitry will begin the spin-up operation during the next boot using the first (low power) spin-up profile.

In one embodiment, if the write cache in the NVSM is full (or near full) the control circuitry may flush the write cache to the disk and then configure the operating mode into a low power mode so that the control circuitry will begin the next spin-up operation using the first spin-up profile. In another embodiment, the NVSM may wear out over time such that the NVSM may be disabled or converted to a read-only device. When this happens, the control circuitry may configure the operating mode of the hybrid drive so that the control circuitry selects the second spin-up profile when spinning up the disk. This is because the NVSM can no longer be used to service write commands which also increases the probability of a cache miss for read commands. Therefore, it is more likely access to the disk will be necessary (e.g., during a boot operation) and so the disk is spun up faster to decrease the access time.

In another embodiment of the present invention, the control circuitry may spin down the disk when entering a low power mode. The disk may be spun down completely, or spun down to a lower standby speed as shown in FIG. 4. Prior to spinning down the disk, data stored on the disk (e.g., in a cache) may be copied to the NVSM cache so that access commands may be serviced by the NVSM without spinning up the disk. The control circuitry may then detect a NVSM cache event (e.g., write cache filling up or predicted cache miss as in FIG. 3) that triggers a spin-up operation beginning with the first spin-up profile.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller and/or NVSM controller, or certain steps described above may be performed by a read channel and others by a disk controller and/or NVSM controller. In one embodiment, the read channel and controllers are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the hybrid drive is powered on. In yet another embodiment, the control circuitry comprises suitable logic circuitry, such as state machine circuitry.

What is claimed is:

1. A hybrid drive comprising:
   a disk;
   a head actuated over the disk;
   a non-volatile semiconductor memory (NVSM) operable to cache data; and
   control circuitry operable to spin-up the hybrid drive by:
      begin spinning up the disk using a first spin-up profile while servicing access commands using the NVSM, including write commands and read commands; and
      when a cache event occurs, finish spinning up the disk using a second spin-up profile in order to spin-up the disk faster.

2. The hybrid drive as recited in claim 1, wherein the second spin-up profile consumes more power than the first spin-up profile.

3. The hybrid drive as recited in claim 1, wherein the cache event occurs when a read command cannot be serviced by the NVSM.

4. The hybrid drive as recited in claim 1, wherein the cache event occurs when the control circuitry predicts an imminent read command will be received that cannot be serviced by the NVSM.

5. A hybrid drive comprising:
   a disk;
   a head actuated over the disk;
   a non-volatile semiconductor memory (NVSM) operable to cache data; and
   control circuitry operable to spin-up the hybrid drive by:
      determining an operating mode of the hybrid drive based on a cache status of the NVSM;
      selecting between a first spin-up profile and a second spin-up profile in response to the operating mode; and
      spinning up the disk using the selected spin-up profile.

6. The hybrid drive as recited in claim 5, wherein the second spin-up profile consumes more power than the first spin-up profile.

7. The hybrid drive as recited in claim 5, wherein the control circuitry changes the operating mode when executing a boot sequence of access commands a read command cannot be serviced by the NVSM.

8. The hybrid drive as recited in claim 5, wherein the control circuitry is further operable to configure the operating mode to select the first spin-up profile after caching data for a number of read commands in the NVSM.

9. The hybrid drive as recited in claim 5, wherein the control circuitry is further operable to:
   begin spinning up the disk using the first spin-up profile while servicing access commands using the NVSM, including write commands and read commands; and
   when a cache event occurs, finish spinning up the disk using the second spin-up profile in order to spin-up the disk faster.

10. A method of spinning up a hybrid drive, the hybrid drive comprising a head actuated over a disk, and a non-volatile semiconductor memory (NVSM) operable to cache data, the method comprising:
    begin spinning up the disk using a first spin-up profile while servicing access commands using the NVSM, including write commands and read commands; and
    when a cache event occurs, finish spinning up the disk using a second spin-up profile in order to spin-up the disk faster.

11. The method as recited in claim 10, wherein the second spin-up profile consumes more power than the first spin-up profile.

12. The method as recited in claim 10, wherein the cache event occurs when a read command cannot be serviced by the NVSM.

13. The method as recited in claim 10, wherein the cache event occurs when predicting an imminent read command will be received that cannot be serviced by the NVSM.

14. A method of spinning up a hybrid drive, the hybrid drive comprising a head actuated over a disk, and a non-volatile semiconductor memory (NVSM) operable to cache data, the method comprising:
    determining an operating mode of the hybrid drive based on a cache status of the NVSM;
    select between a first spin-up profile and a second spin-up profile in response to the operating mode; and
    spin up the disk using the selected spin-up profile.

15. The method as recited in claim 14, wherein the second spin-up profile consumes more power than the first spin-up profile.

16. The method as recited in claim 14, further comprising changing the operating mode when executing a boot sequence of access commands a read command cannot be serviced by the NVSM.

17. The method as recited in claim 14, further comprising configuring the operating mode to select the first spin-up profile after caching data for a number of read commands in the NVSM.

18. The method as recited in claim 14, further comprising:
    begin spinning up the disk using the first spin-up profile while servicing access commands using the NVSM, including write commands and read commands; and
    when a cache event occurs, finish spinning up the disk using the second spin-up profile in order to spin-up the disk faster.

* * * * *